United States Patent [19]
Noda et al.

[11] Patent Number: 5,784,119
[45] Date of Patent: Jul. 21, 1998

[54] VIDEO DECODING DEVICE FOR DECODING VIDEO DATA IN SYNCHRONISM WITH A SYSTEM CLOCK

[75] Inventors: Yasumasa Noda; Eiitsu Goto; Hiroshi Nakajima, all of Tokyo, Japan

[73] Assignee: Oki Electric Industry Co., Ltd., Tokyo, Japan

[21] Appl. No.: 613,759

[22] Filed: Feb. 26, 1996

[30] Foreign Application Priority Data

Mar. 6, 1995 [JP] Japan ................... 7-0045532

[51] Int. Cl.$^6$ .................. H04N 9/475; H04N 7/01
[52] U.S. Cl. ............. 348/512; 348/423; 370/509; 370/474; 375/362; 375/376
[58] Field of Search ....................... 348/423, 512, 348/515, 465; 370/509, 510, 542, 474, 506, 503, 516, 513; 375/376, 368, 354, 371, 362; H04N 7/01, 9/475

[56] References Cited

U.S. PATENT DOCUMENTS

| | | | |
|---|---|---|---|
| 5,396,497 | 3/1995 | Veltman ........................ | 348/423 |
| 5,521,927 | 5/1996 | Kim et al. ..................... | 348/423 |
| 5,565,924 | 10/1996 | Haskell et al. ................ | 348/423 |
| 5,594,669 | 1/1997 | Sung et al. .................... | 364/514 R |
| 5,598,352 | 1/1997 | Rosenau et al. ............... | 348/423 |
| 5,598,415 | 1/1997 | Nuber et al. .................. | 370/474 |
| 5,668,841 | 9/1997 | Haskell et al. ................ | 375/371 |
| 5,668,916 | 9/1997 | Fujinami ....................... | 386/47 |
| 5,684,804 | 11/1997 | Baronetti et al. ............. | 370/509 |

OTHER PUBLICATIONS

ITU-T (International Telecommunication Union-telecommunication Recommendation H.222.0. "General Coding of Moving Pictures and Associated Audio" Geneva 1995, pp. 43–209, of which an English translation is not now available.

International Organization for Standardization, ISO/IEC JTC1/SC29/WG11, "Coding of Moving Pictures and Associated Audio", Nov. 1993.

*Primary Examiner*—Michael B. Lee
*Attorney, Agent, or Firm*—Spencer & Frank

[57] ABSTRACT

In a video decoding device, a system decoding section analyzes header information included in multiplex data and performs various operations, including the separation of data, on the basis of the header information. An STC (System Time Clock) counter generates, based on an SCR (System Clock Reference)/PCR (Program Clock Reference) which is time reference data included in the multiplex data, a system clock synchronous to the system clock of a coding device. A video decoding section decodes video data included in the multiplex data in response to the system clock. Also, the video decoding section generates a clock for video display synchronous to the system clock and outputs the decoded video data in response to the clock for video display. The decoding device may additionally include an audio decoding section for decoding audio data included in the multiplex data in response to the system clock, generating a clock for audio output and synchronous to the system clock, and outputting the decoded audio data in response to the clock for audio output. The decoding device obviates frame slipping and other errors even when the clock of an input system, i.e., the coding side and the clock for representation at the decoding side are different from each other.

11 Claims, 4 Drawing Sheets

VIDEO DECODING DEVICE FOR DECODING VIDEO DATA IN SYNCHRONISM WITH A SYSTEM CLOCK

BACKGROUND OF THE INVENTION

1. Field of the Invention

The present invention relates to a device for decoding a signal representative of a moving picture and based on a Moving Picture Coding Experts Group (MPEG) system or similar moving picture coding system intended for storage.

2. Description of the Background Art

In a conventional MPEG decoding device, a system clock and presentation clocks, i.e., clocks for audio output and video display are generated independently of each other. The system clock refers to a common clock shared by, e.g. audio data and video data to be reproduced synchronously. The frequency of the system clock is 90 kHz in MPEG1 and 27 MHz in MPEG2. For this kind of system clock, a reference may be made to International Organization for Standardization, ISO/IEC JTC1/SC29/WG11, "Coding of Moving Pictures and Associated Audio", November 1993. In the MPEG system, a coding device writes values sequentially counted up by the system clock in a header as time stamps, while the decoding device executes control on the basis of the time stamps. As a result, the system clock of the coding side and that of the decoding side are synchronized to each other.

However, the arrangement wherein the system clock and clocks for presentation are generated independently of each other has the following problem. When the presentation clock at the decoding side is even slightly different from the clock at the input system, i.e., the coding side (e.g. camera input clock), frame slipping and sample slipping are apt to occur. In addition, it is likely that a single frame is displayed twice or that a single sample is output twice. This is particularly critical when it comes to the broadcast quality of, e.g., CATV (Cable Television) toward which MPEG2 is directed.

SUMMARY OF THE INVENTION

It is therefore an object of the present invention to provide a video decoding device capable of decoding video data in synchronism with a system clock and thereby obviating frame slipping and other errors.

In accordance with the present invention, in a video decoding device for receiving multiplex data including coded video data and time reference data representative of a time reference of a clock for coding and time division multiplexed with the coded video data, and decoding the video data, a first clock generating section generates, based on the time reference data, a first clock for decoding and synchronous to the clock for coding. A video decoding section decodes, in response to the first clock, the video data included in the multiplex data. A second clock generating section generates a second clock for video display and synchronous to the first clock. A video data outputting section outputs, in response to the second clock, the video data decoded by the decoding section.

Also, in accordance with the present invention, in an audio and video decoding device for receiving multiplex data including coded audio data, coded video data, and time reference data representative of a time reference of a clock for coding and time division multiplexed with the coded audio data and coded video data, and decoding the audio data and video data, a first clock generating section generates, based on the time reference data, a first clock for decoding and synchronous to the clock for coding. An audio decoding section decodes, in response to the first clock, the audio data included in the multiplex data. A video decoding section decodes, in response to the first clock, the video data included in the multiplex data. A second clock generating section generates a second clock for audio output and synchronous to the first clock. An audio outputting section outputs, in response to the second clock, the audio data decoded by the audio decoding section. A third clock generating section for generates a third clock for video display and synchronous to the first clock. A video data outputting section outputs, in synchronism with the third clock, the video data decoded by the video decoding section.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
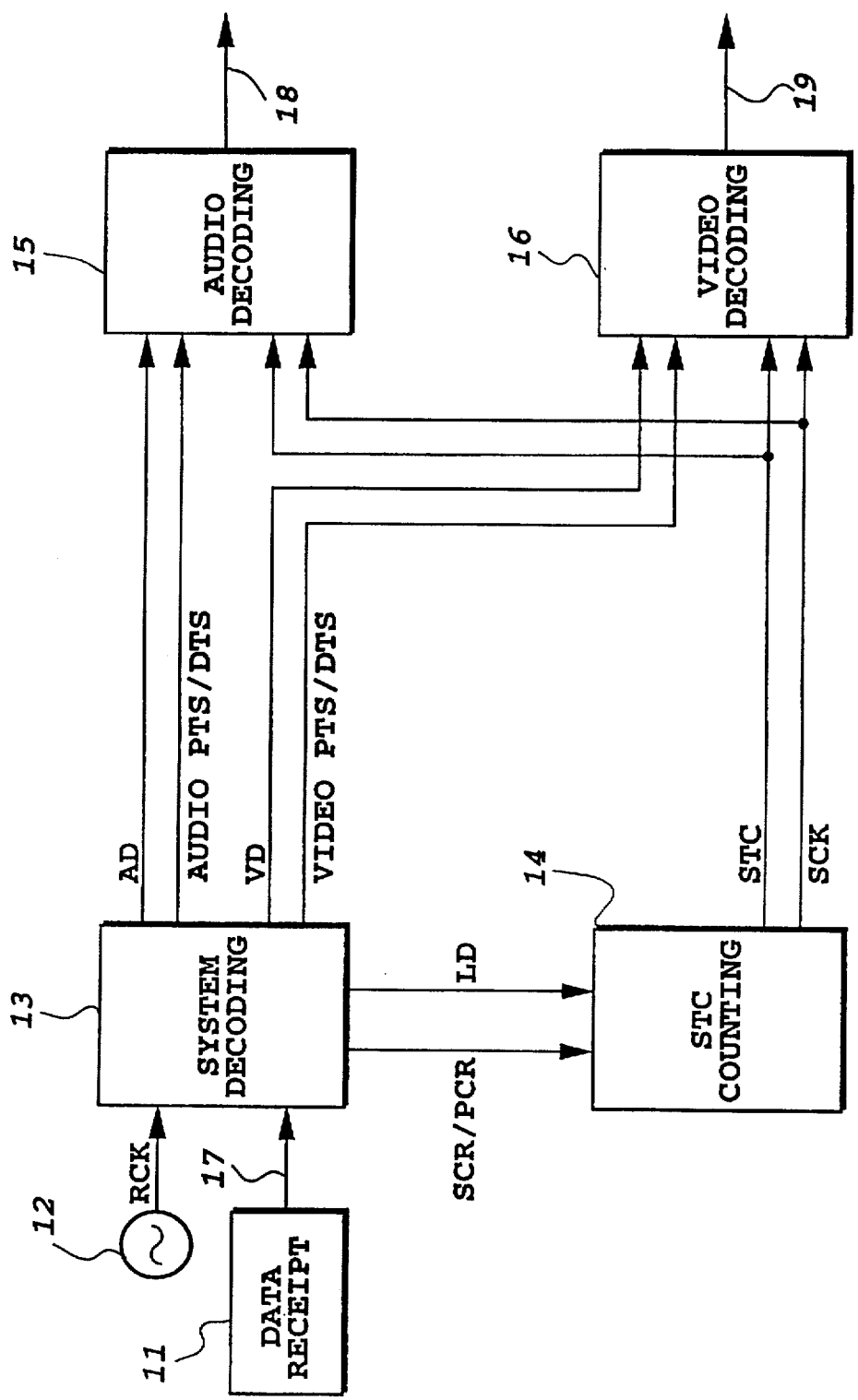
FIG. 1 is a block diagram schematically showing a decoding device embodying the present invention and implemented as an MPEG decoding device by way of example.

Referring to FIG. 1 of the drawings, a video decoding device embodying the present invention is shown and implemented as an MPEG decoding device by way of example. As shown, the device is made up of a data receiver 11, a read clock generator 12, a system decoding 13, an STC (System Time Clock) counting 14, an audio decoding 15, and a video decoding 16 which are interconnected, as illustrated.

The data receiver 11 receives a bit sequence of multiplex data from a coding device, not shown, over a line. A CD (Compact Disk) ROM (Read Only Memory) or similar storage medium, not shown, storing bit sequences of multiplex data may be removably mounted to the data receiver 11. In such a case, the data receiver 11 will read the multiplex data out of the storage medium. The received bit sequence of multiplex data is applied from the data receiver 11 to the system decoding 13 over a connection line 17. It is to be noted that the multiplex data include audio data AD, video data VD and private data coded independently of each other and then multiplexed by a time division scheme. The multiplex data further include a header for dividing the frames of the multiplex data. The header includes presentation time stamps (PTS) and decoding time stamps (DTS) which will be described specifically later.

The read clock generator 12 includes a self-running oscillator, not shown, and outputs a read clock RCK for reading the bit sequence of multiplex data out of the data receiver 11. The read clock RCK is fed to the system decoding 13. The read clock RCK has a preselected frequency equal to the frequency of a write clock used to write data at the coding side.

The system decoding 13 has some different functions, as follows. First, the decoding 13 reads the bit sequence of multiplex data out of the data receiver 11 in response to the read clock RCK input from the read clock generator 12, and analyzes header information included in the data. Second, the decoding 13 demultiplexes, based on the result of analysis, the bit sequence of multiplex data into a bit sequence of audio data AD, a bit sequence of video data VD, and a bit sequence of private data. The bit sequence of audio data AD and the bit sequence of video data VD are fed to the audio decoding 15 and video decoding 16, respectively. Third, the decoding 13 separates, also based on the result of the above analysis, PTSs and DTSs necessary for synchronous reproduction from the header of the multiplex data, and feeds the PTSs/DTSs for audio and the PTSs/DTSs for video to the audio decoding 15 and video decoding 16, respectively.

The PTSs mentioned are the information necessary for the decodings 15 and 16 to perform presentation, i.e., audio output and video display. The DTSs are the information indicative of the timings for the decodings 15 and 16 to start decoding. Each of the PTSs and DTSs is 33-bit data representative of a timing value measured by use of a 90 kHz clock.

Fourth, the system decoding 13 detects, based on the result of analysis of the header information, the timing at which the last byte of an SCR (System Clock Reference)/ PCR (Program Clock Reference) field included in the multiplex data arrives, generates a counter load timing signal LD on the basis of the result of detection, and delivers the signal LD to the STC counting 14. The SCR/PCR is the time reference data for setting or correcting the value of an STC, which will be described, to a value intended by the coding side. Fifth, the decoding 13 separates the SCR from the SCR/PCR field of the bit sequence of the multiplex data, and feeds it to the STC counting 14. Why the counter load timing signal LD and SCR/PCR are fed to the STC counting 14 is that the system clock SCK of the decoding device should be synchronous to the system clock of the coding device. In the MPEG decoding device shown in FIG. 1, the read clock RCK is used as a time master.

The STC counting 14 synchronizes the system clock SCK of the decoding device to the system clock of the coding device on the basis of the counter load timing signal LD and SCR/PCR fed from the system decoding 13. Also, the counting 14 generates the STC by counting the system clock SCK. Further, the counting 14 feeds the system clock SCK and STC to the audio decoding 15 and video decoding 16.

The audio decoding 15 decodes the audio data AD in response to the system clock SCK when the STC coincides with the audio DTSs. Also, the decoding 15 synchronizes a clock for audio output to the system clock SCK. Further, the decoding 15 outputs the decoded audio data via an output 18 in response to the audio output clock when the STC coincides with the audio PTSs. A loudspeaker or similar audio reproduction device, not shown, will be connected to the output 18.

The video decoding 16 decodes the video data VD in response to the system clock when the STC coincides with the video DTSs. Also, the decoding 16 synchronizes a clock for video display to the system clock SCK. Further, the decoding 16 outputs the decoded video data via an output 19 in response to the video display clock when the STC coincides with the video PTSs. A CRT (Cathode Ray Tube) display or similar video display will be connected to the output 19.

Figure 2:
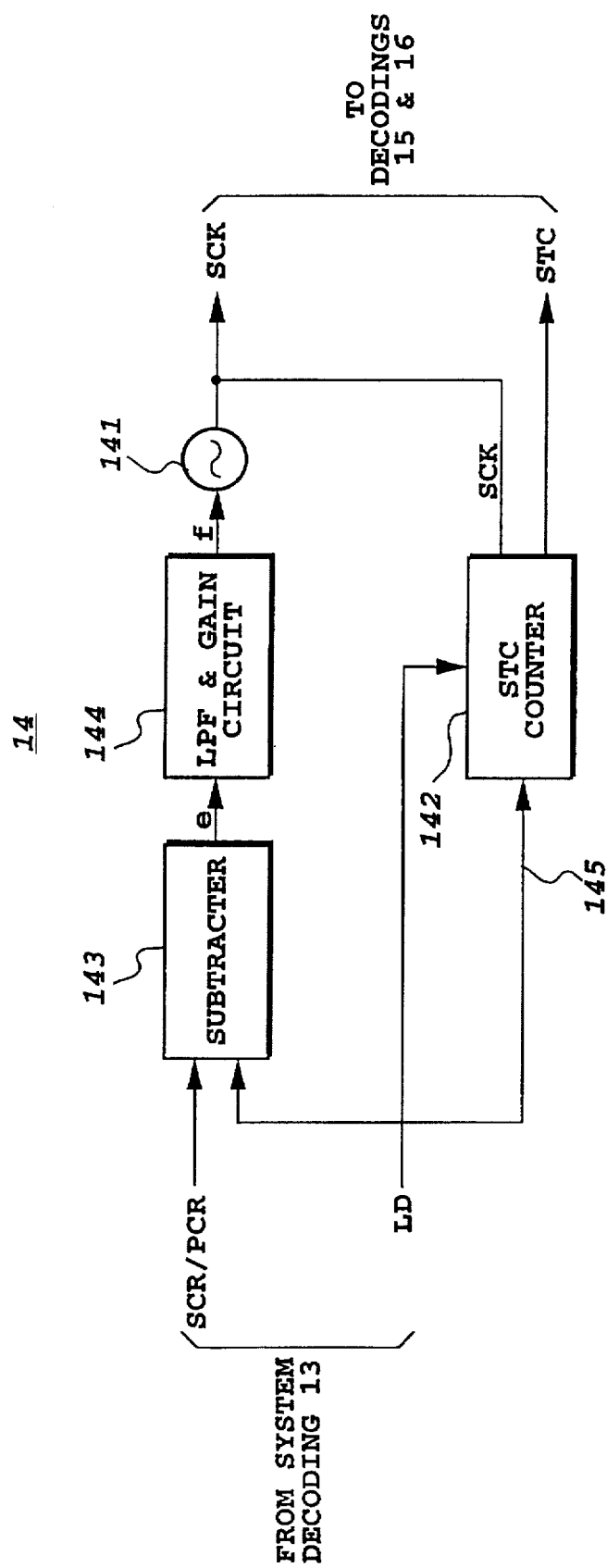
FIG. 2 is a schematic block diagram showing a specific construction of an STC (System Time Clock) counting section included in the embodiment.

FIG. 2 shows a specific construction of the STC counting 14. As shown, the counting 14 has a voltage controlled oscillator 141, an STC counter 142, a subtracter 143, and a low-pass filter (LPF) and gain circuit 144 which are interconnected, as illustrated. These constituents 141–144 of the counting 14 constitute a phase locked loop (PLL) for causing the system clock SCK to follow changes in SCR/ PCR. The voltage controlled oscillator 141 has its oscillation frequency controlled in accordance with a phase difference between the SCR/PCR and the system clock SCK, i.e., a control voltage e which will be described. The oscillation frequency of the oscillator 141 is output as the system clock SCK. The STC counter 142 outputs the STC by counting the system clock SCK. The subtracter 143 subtracts, in response to the counter load timing LD output from the system decoding 13, the count 145 of the counter 142 (STC value) from the SCR/PCR value fed from the system decoding 13 and outputs the resulting difference e. The LPF and gain circuit 144 generates a control voltage f based on the output e of the subtracter 143 and meant for the oscillator 141.

As for the MPEG configuration, there has been proposed an arrangement wherein on the arrival of the SCR/PCR, it is substituted for the count of the STC counter 142 so as to equalize the count of the counter 142 and that of an STC counter included in the coding device. The problem with this kind of scheme is that although the counts of the two STC counters are apparently equal to each other, frame slipping may occur because the synchronization of the system clock SCK is not guaranteed (within the prescribed MPEG specifications). To realize the complete decoding of coded data, the illustrative embodiment uses the PLL 14 which receives the SCR/PCR as an input signal and produces the system clock SCK as an output signal. This successfully synchronizes the system clock SCK to the system clock of the coding side.

Figure 3:
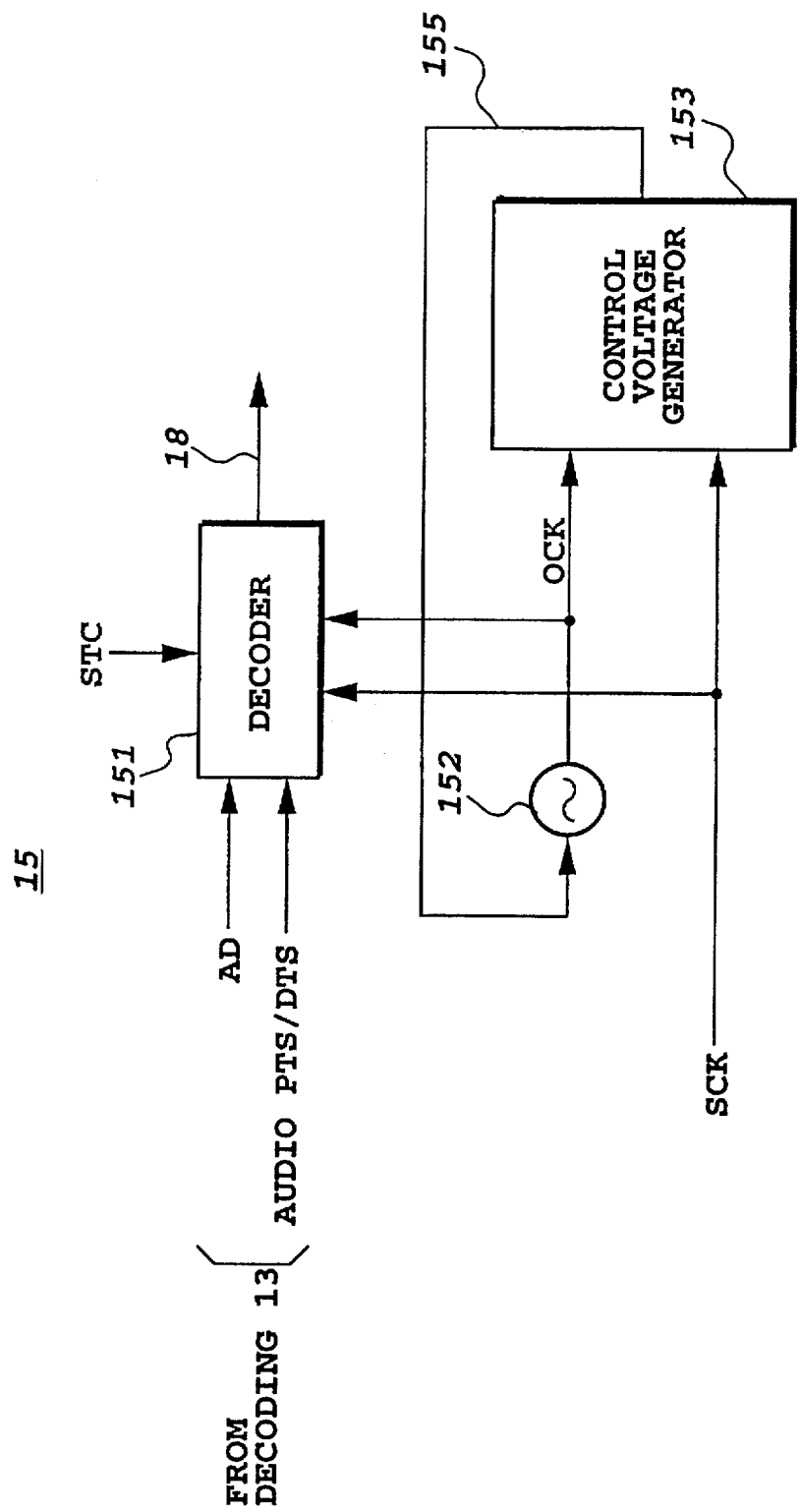
FIG. 3 is a schematic block diagram showing a specific construction of an audio decoding section also included in the embodiment.

A reference will be made to FIG. 3 for describing a specific construction of the audio decoding 15. As shown, the decoding 15 has a decoder 151, a voltage controlled oscillator 152, and a control voltage generator 153 which are interconnected, as illustrated. The decoder 151 receives the STC and decodes the audio data AD in response to the system clock SCK when the STC coincides with the audio DTSs. In addition, the decoder 151 delivers the decoded audio data to the loudspeaker via an output 18 in response to a clock OCK for audio output when the STC coincides with the audio PTSs.

The audio output clock OCK is generated by the voltage controlled oscillator 152 and fed to the decoder 151 and control voltage generator 153. The oscillator 152 and control voltage generator 153 constitute a PLL for synchronizing the audio output clock OCK to the system clock SCK. The oscillator 152 receives the system clock SCK and has its oscillation frequency controlled in accordance with a difference 155 between the system clock SCK and the audio output clock OCK. The oscillation frequency of the oscillator 152 is delivered as the audio output clock OCK. The control voltage generator 153 compares the output clock OCK with the system clock SCK and generates, based on the result of comparison, the control voltage 155 for controlling the oscillator 152.

Figure 4:
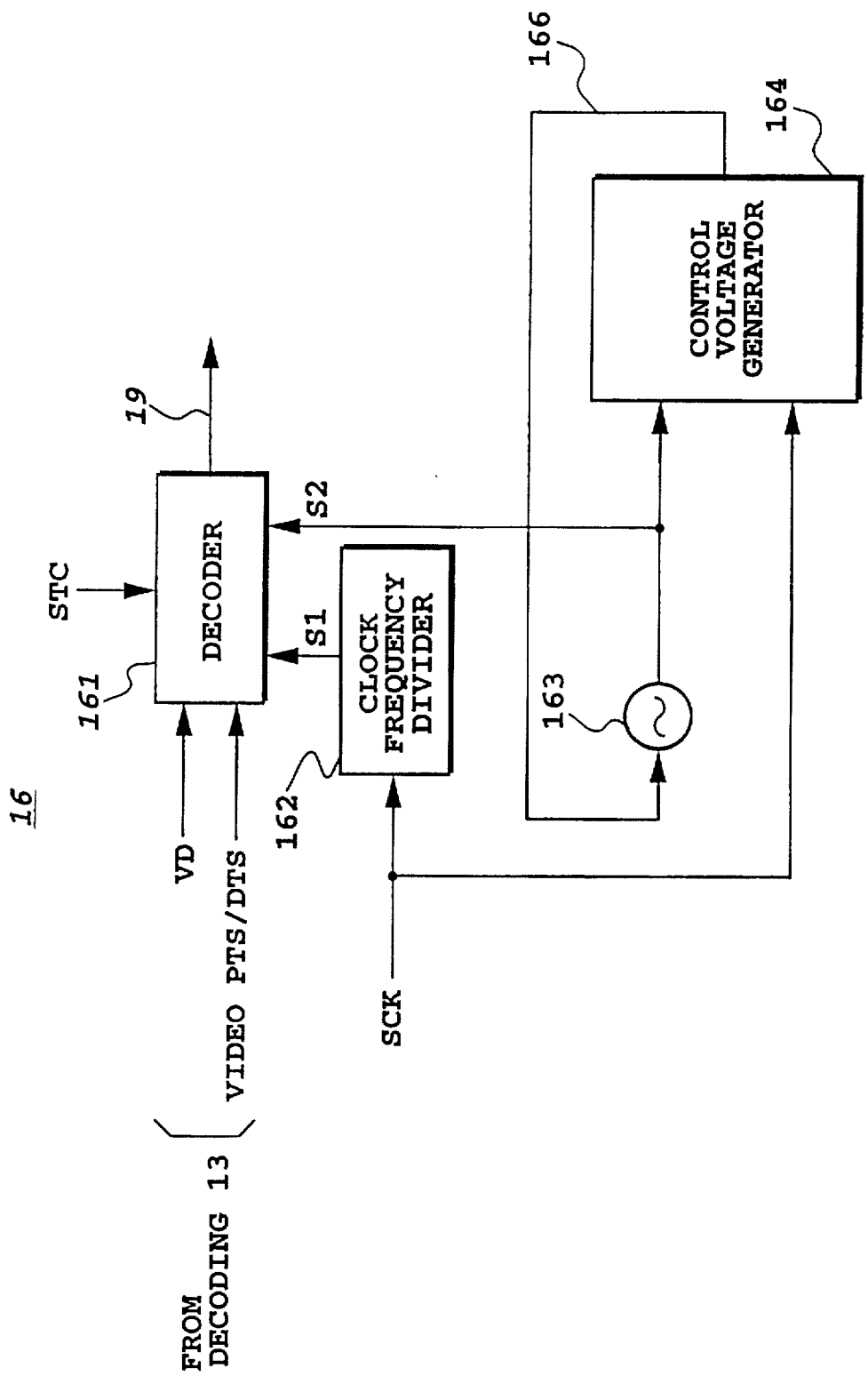
FIG. 4 is a schematic block diagram showing a specific construction of a video decoding section further included in the embodiment.

FIG. 4 shows a specific configuration of the video decoding 16. As shown, the decoding 16 has a decoder 161, a clock frequency divider 162, a voltage controlled oscillator 163, and a control voltage generator 164 which are interconnected, as illustrated. The decoder 161 receives the STC and decodes the video data VD in response to the system clock SCK when the STC coincides with the video DTSs. In addition, the decoder 161 delivers the decoded video data to a display, not shown, via an output 19 in response to a clock for display when the STC coincides with the video PTSs. The display clock consists of a synchronizing signal, e.g., a horizontal and a vertical synchronizing signal S1, and a color subcarrier S2.

The clock frequency divider 162 receives the system clock SCK and divides its frequency in order to generate the synchronizing signal S1 for video display and synchronous to the system clock SCK. The synchronizing signal S1 is applied to the decoder 161. The color subcarrier S2 is generated by the voltage controlled oscillator 163. The oscillator 163 and control voltage generator 164 constitute a PLL for synchronizing the color subcarrier S2 to the system clock SCK. The oscillator 163 has its oscillation frequency controlled in accordance with a difference 166 between the color subcarrier S2 and the system clock SCK and outputs the oscillation frequency as the color subcarrier S2. The control voltage generator 164 compares the phase of the system clock SCK and that of the color subcarrier S2 and generates the control voltage 166 based on the result of comparison and meant for the oscillator 163.

As stated above, the audio decoding 15 and video decoding 16 are each capable of producing an output fully synchronous to the clock of the coding side by synchronizing the respective presentation clock (audio output clock OCK or video output clock (video display synchronizing signal S1 and color subcarrier S2)) to the system clock SCK. Hence, only if the decodings 15 and 16 each outputs the respective decoded data in response to the presentation clock when the STC coincides with the PTSs, fully synchronous reproduction free from frame slipping is achievable.

In the illustrative embodiment, the prerequisite is that the coding side has its system clock and clock for an audio data and video data input system synchronized to each other. In the MPEG configuration, the synchronization set up between the two clocks is indicated by a system audio lock flag and a system video lock flag which are in their ON states. When these flags are in their OFF states, the embodiment is not capable of implementing full synchronous reproduction.

The embodiment uses the read clock RCK as a time master, as stated earlier. In this condition, when the frequency of the read clock RCK differs from the frequency of the write clock used at the coding side, all the timings included in the MPEG decoding device are shifted in proportion to the difference between the former and the latter. Specifically, if the read clock RCK is fast, the presentations (audio output and video display) is also fast; if the former is slow, the latter is also slow. However, the reproduction is free from frame slipping and other errors because the relation between the data themselves is identical with the relation provided at the coding side.

It may appear that the only requirement is the allowable processing ability of the decoding device. However, the above difference in frequency between the write clock and the read clock RCK is likely to bring about a problem in the video decoding 16 shown in FIG. 4, because the color subcarrier requires an absolute frequency of 3.58 MHz. For example, when the frequency of the read clock RCK is one half of the frequency of the write clock, the color subcarrier S2 has its frequency reduced to 1.79 MHz, resulting in a faulty color output. Therefore, the read clock RCK needs accuracy satisfying the allowable range of the color subcarrier S2, i.e., 3 parts per million (PPM). When the MPEG decoding device is connected to the coding device by a line, the above problem does not occur because the frequency of the write clock and that of the read clock RCK are usually the same as each other.

In operation, the multiplex data received by the data receipt 11 or multiplex data stored in the storage medium removably mounted to the receipt 11 are applied to the system decoding 13 in synchronism with the read clock RCK. The decoding 13 analyzes the header information included in the multiplex data and separates, based on the result of analysis, the SCR/PCR contained in the SCR/PCR field. Also, the decoding 13 separates audio PTSs/DTSs and video TPSs/DTSs on the basis of the result of analysis. Further, the decoding 13 demultiplexes the multiplex data into the audio data AD, video data VD, and private data in accordance with the result of analysis. On the arrival of the last byte of the SCR/PCR field, the decoding 13 generates the counter load timing signal LD. The SCR/PCR and counter load timing signal LD are fed to the STC counting 14. The audio data AD and audio PTSs/DTSs are applied to the audio decoding 15 while the video data VD and video PTSs/DTSs are applied to the video decoding 16.

On receiving the SCR/PCR and counter load timing signal LD, the STC counting 14 generates the system clock SCK synchronous to the system clock of the coding side. Also, the counting 14 generates the STC by counting the system clock SCK. The system clock SCK and STC are fed to the audio decoding 15 and video decoding 16.

The audio decoding 15 received the audio data AD from the system decoding 13 decodes the data AD in response to the system clock SCK when the STC coincides with the audio DTSs. In addition, when the decoding 15 receives the system clock SCK from the STC counting 14, it generates the audio output clock OCK synchronous to the clock SCK. The decoding 15 feeds the decoded audio data to the loudspeaker via the output 18 in response to the clock OCK when the STC coincides with the audio PTSs.

The video decoding 16 received the video data VD from the system decoding 13 decodes the data VD in response to the system clock SCK when the STC coincides with the video DTSs. On receiving the system clock SCK from the STC counting 14, the decoding 16 generates the video display clocks S1 and S2 synchronous to the clock SCK. When the STC coincides with the video PTSs, the decoding 16 displays the decoded video data on the display via the output 19 in response to the clocks S1 and S2.

The operation of the STC counting 14 shown in FIG. 2 will be described specifically. The counting 14 synchronizes the system clock SCK to the system clock of the coding device, as stated previously. Generally, so long as the system clock of the coding device and that of the decoding device are synchronous to each other, the SCR/PCR value and the count (STC value) of the STC counter 142 to appear at the time of counter loading are equal. This is because the SCR/PCR value is the STC value of the coding device appeared when the last byte of the SCR/PCR field was output. However, when the count (STC value) at the time of counter loading and the SCR/PCR value are different from each other, the subtracter 143 produces a difference between them. The LPF and gain circuit 144 generates the control voltage f on the basis of the difference e and controls the voltage controlled oscillator 141 therewith. As a result, on the elapse of a certain period of time, the difference e converges to zero, i.e., the phase and frequency of the system clock SCK coincide with the phase and frequency of the system clock of the coding device. The difference between the SCR and the PCR is that in MPEG2, PSs (Program Streams) and TSs (Transport Streams) use the SCR and PCR, respectively.

The operation of the audio decoding 15 shown in FIG. 3 will be described in detail. The decoder 151 received the audio data AD from the system decoding 13 decodes the data AD in response to the system clock SCK when the STC coincides with the audio DTSs. The decoded data are fed to the loudspeaker via the output 18 in synchronism with the audio output clock OCK. The clock OCK is applied from the voltage controlled oscillator 152 to the control voltage generator 153 also. The control voltage generator 153 compares the phase of the clock OCK with the phase of the system clock SCK fed from the STC counting 14. The control voltage generator 153 generates the control voltage 155 for the oscillator 152 on the basis of the result of comparison. Consequently, the clock OCK is fully synchronous to the system clock SCK and insures fully synchronous reproduction free from sample slipping and other errors.

The operation of the video decoding 16 shown in FIG. 3 will be described specifically. The decoder 161 received the video data VD from the system decoding 13 decode the data VD in response to the system clock SCK when the STC coincides with the video DTSs. The decoded data are sent to the display via the output 19 in response to the video display clock (synchronizing signal S1 and color subcarrier S2) when the STC coincides with the video PTSs.

To generate the synchronizing signal S1 for video display, the clock frequency 162 divides the frequency of the system clock SCK. Hence, the synchronizing signal S1 is synchronous to the system clock SCK. The color subcarrier S2 is fed from the voltage controlled oscillator 163 to the control voltage generator 164 also. The control voltage generator 164 compares the phase of the subcarrier S2 with the phase of the system clock SCK, and generates the control voltage 166 for the oscillator 163 in accordance with the result of comparison. Consequently, the subcarrier S2 is synchronous to the system clock SCK and insures fully synchronous reproduction free from frame slipping and other errors.

As stated above, the illustrative embodiment generates, based on the SCR/PCR contained in the multiplex data, the system clock SCK synchronous to the system clock used at the coding side. Then, the embodiment generates the clocks for presentation in synchronism with the above system clock SCK. Hence, if the write clock and read clock are coincident, the embodiment realizes full synchronous reproduction by obviating frame slipping and other errors.

Assume that the system clock SCK and the clocks for presentation are generated independently of each other, as has been customary in the art. Further, assume that the system clock and video display synchronizing signal have a frequency of 27 MHz and a frequency of 30 Hz, respectively. Then, if the individual signal conforms to the MPEG2 specifications, frame slipping or the double output of a single frame occurs once for about 9,900 frames, i.e., once for 326 seconds. This frequency increases with an increase in the deviation of the phase of the synchronizing signal S1 which is independent of the system clock SCK. The embodiment shown and described is free from such a problem because it synchronizes the system clock SCK to the system clock of the coding side and synchronizes the clocks for presentation to the system clock SCK.

In summary, in accordance with the present invention, a video decoding device generates, based on an SCR/PCR contained in multiplex data, a clock for decoding and synchronous to a clock for coding. Then, the device generates a clock for audio output and a clock for video output in synchronism with the clock for decoding. Hence, even if the clocks for presentation used at the decoding side are different in frequency from the clock used at the input system, i.e., the coding side, the present invention realizes full synchronous reproduction free from frame slipping and other errors.

While the present invention has been described with reference to the particular illustrative embodiment, it is not to b e restricted by the embodiment. It is to be appreciated that those skilled in the art can change or modify the embodiment without departing from the scope and spirit of the present invention. For example, while the embodiment has concentrated on the MPEG decoding device prescribed by ISO/IEC, the present invention is applicable to any other decoding device so long as it is of the type receiving coded audio and/or video data and data representative of a time reference multiplexed with the audio and/or video data by a time division scheme, and decoding the audio and/or video data included in the multiplex data. Particularly, the function of decoding the audio data is not essential with the present invention.

What is claimed is:

1. A video decoding device for receiving multiplex data including coded video data and time reference data representative of a time reference of a clock for coding and time division multiplexed with the coded video data, and decoding the video data, said video decoding device comprising:

first clock generating means for generating, based on the time reference data, a first clock for decoding and synchronous to the clock for coding;

video decoding means for decoding, in response to said first clock, the video data included in the multiplex data;

second clock generating means for generating a second clock for video display and synchronous to said first clock; and video data outputting means for outputting, in response to said second clock, the video data decoded by said decoding means.

2. A video decoding device in accordance with claim 1, wherein the multiplex data are data coded by a Moving Picture Coding Experts Group (MPEG) system and further include a header for dividing frames of the multiplex data, wherein the time reference data includes time stamps representative of values counted by a system clock when the multiplex data are coded by a coding device, and wherein said first clock generating means comprises separating means for separating the time stamps from the header by analyzing the header, and generates said first clock on the basis of the time stamps.

3. A video decoding device in accordance with claim 1, wherein said second clock generating means comprises:

frequency dividing means for dividing a frequency of said first clock to thereby generate a synchronizing signal for video display; and a phase locked loop for generating a color subcarrier out of said first clock;

wherein said synchronizing signal for video display and said color subcarrier constitute said second clock.

4. A video decoding device in accordance with claim 2, wherein said first clock generating means further comprises third clock generating means for generating a third clock having a preselected frequency substantially equal to a frequency of the clock for coding as a read clock, wherein said separating means analyzes the header in response to said third clock to thereby separate the time reference data from the header, and wherein said first clock generating means further comprises a phase locked loop for generating said first clock synchronous to the time reference data separated by said separating means.

5. A video decoding device in accordance with claim 1, further comprising data receiving means for receiving the multiplex data and feeding the multiplex data received to said first clock generating means and said video decoding means.

6. An audio and video decoding device for receiving multiplex data including coded audio data, coded video data, and time reference data representative of a time reference of a clock for coding and time division multiplexed with the coded audio data and the coded video data, and decoding the audio data and the video data, said audio and video decoding device comprising:

first clock generating means for generating, based on the time reference data, a first clock for decoding and synchronous to the clock for coding;

audio decoding means for decoding, in response to said first clock, the audio data included in the multiplex data;

video decoding means for decoding, in response to said first clock, the video data included in the multiplex data;

second clock generating means for generating a second clock for audio output and synchronous to said first clock;

audio outputting means for outputting, in response to said second clock, the audio data decoded by said audio decoding means;

third clock generating means for generating a third clock for video display and synchronous to said first clock; and video data outputting means for outputting, in synchronism with said third clock, the video data decoded by said video decoding means.

7. An audio and video decoding device in accordance with claim 6, wherein the multiplex data are data coded by a Moving Picture Coding Experts Group (MPEG) system and include a header for dividing frames of the multiplex data, wherein the time reference data includes time stamps representative of values counted by a system clock when the multiplex data are coded by a coding device, and wherein said first clock generating means comprises separating means for separating the time stamps from the header by analyzing the header, and generates said first clock on the basis of the time stamps.

8. An audio and video decoding device in accordance with claim 6, wherein said second clock generating means comprises:

frequency dividing means for dividing a frequency of said first clock to thereby generate a synchronizing signal for video display; and a phase locked loop for generating a color subcarrier out of said first clock;

wherein said synchronizing signal for video display and said color subcarrier constitute said third clock.

9. An audio and video decoding device in accordance with claim 7, wherein said first clock generating means further comprises fourth clock generating means for generating a fourth clock having a preselected frequency substantially equal to a frequency of the clock for coding as a read clock, wherein said separating means analyzes the header in response to said fourth clock to thereby separate the time reference data from the header; and wherein said first clock generating means further comprises a phase locked loop for generating said first clock synchronous to the time reference data separated by said separating means.

10. An audio and video decoding device in accordance with claim 6, further comprising data receiving means for receiving the multiplex data and feeding the multiplex data received to said first clock generating means, said audio decoding means, and said video decoding means.

11. An audio and video decoding device in accordance with claim 6, wherein said second clock generating means comprises a phase locked loop for generating said second clock out of said first clock.

* * * * *